(12) United States Patent
Zhang et al.

(10) Patent No.: US 12,354,315 B2
(45) Date of Patent: Jul. 8, 2025

(54) METHOD FOR ENCODING AND DECODING A POINT CLOUD

(71) Applicants: Beijing Xiaomi Mobile Software Co., Ltd., Beijing (CN); Xidian University, Shaanxi (CN)

(72) Inventors: Wei Zhang, Shaanxi (CN); Mary-Luc Georges Henry Champel, Beijing (CN)

(73) Assignees: Beijing Xiaomi Mobile Software Co., Ltd., Beijing (CN); Xidian University, Xi'An (CN)

( * ) Notice: Subject to any disclaimer, the term of this patent is extended or adjusted under 35 U.S.C. 154(b) by 300 days.

(21) Appl. No.: 18/001,962

(22) PCT Filed: Jun. 24, 2020

(86) PCT No.: PCT/CN2020/098272
§ 371 (c)(1),
(2) Date: Dec. 15, 2022

(87) PCT Pub. No.: WO2021/258374
PCT Pub. Date: Dec. 30, 2021

(65) Prior Publication Data
US 2023/0267651 A1    Aug. 24, 2023

(51) Int. Cl.
*G06T 9/40* (2006.01)
*G06T 9/00* (2006.01)
*H04N 19/61* (2014.01)

(52) U.S. Cl.
CPC ............... *G06T 9/40* (2013.01); *G06T 9/001* (2013.01); *H04N 19/61* (2014.11)

(58) Field of Classification Search
None
See application file for complete search history.

(56) References Cited

U.S. PATENT DOCUMENTS 10,223,810 B2    3/2019   Chou et al.
10,674,165 B2    6/2020   Panusopone et al.
(Continued)

FOREIGN PATENT DOCUMENTS

CA    3096452 A1    10/2019
CA    3103454 A1    12/2019
(Continued)

OTHER PUBLICATIONS

European Patent Office, Office Action Issued in Application No. 20196648.8, Jan. 25, 2024, Germany, 5 pages.
(Continued)

*Primary Examiner* — Anand P Bhatnagar
(74) *Attorney, Agent, or Firm* — Finnegan, Henderson, Farabow, Garrett & Dunner, L.L.P

(57) ABSTRACT

A method for encoding attributes of points of a point cloud, includes: determining a true transform coefficient by applying RAHT to attributes of a present node; determining a difference between attributes of a present parent node and each parent node of a first set of parent nodes sharing a face or an edge with the present node; selecting a second set of parent nodes from the first set of parent nodes according to the difference; determining a predicted value for the attributes of the present node according to attributes of the second set of parent nodes; determining a predicted transform coefficient by applying the RAHT to the predicted value of the attributes of the present node; determining a residual from the true transform coefficient and the predicted transform coefficient; and encoding the residual to produce encoded data of attributes of the point cloud for a bitstream.

22 Claims, 7 Drawing Sheets

(56) References Cited

U.S. PATENT DOCUMENTS

| | | | |
|---|---|---|---|
| 10,693,492 | B1 | 6/2020 | Lasserre et al. |
| 10,694,210 | B2 | 6/2020 | Chou et al. |
| 11,483,363 | B2* | 10/2022 | Hur ...................... H04N 19/593 |
| 11,563,984 | B2* | 1/2023 | Zhang .................. H04N 19/184 |
| 11,601,488 | B2* | 3/2023 | Hur ........................ G06T 9/001 |
| 11,601,675 | B2* | 3/2023 | Park .................... H04N 19/597 |
| 11,611,775 | B2* | 3/2023 | Gao ..................... H04N 19/119 |
| 11,615,557 | B2* | 3/2023 | Flynn .................... H04N 19/13 345/419 |
| 11,620,768 | B2* | 4/2023 | Flynn ....................... G06T 9/40 345/419 |
| 11,676,310 | B2* | 6/2023 | Huang .................. B60W 40/10 382/100 |
| 11,711,545 | B2* | 7/2023 | Zhang .................. H04N 19/436 375/240.26 |
| 11,736,726 | B2* | 8/2023 | Zhang .................... H04N 19/70 375/240.26 |
| 11,750,839 | B2* | 9/2023 | Zhang .................... H04N 19/46 375/240.26 |
| 11,843,803 | B2* | 12/2023 | Zhang .................. H04N 19/176 |
| 11,895,307 | B2* | 2/2024 | Mammou ................. G06T 9/40 |
| 11,936,850 | B2* | 3/2024 | Wan ..................... H04N 19/167 |
| 11,948,336 | B2* | 4/2024 | Zhang .................... H04N 19/96 |
| 12,010,341 | B2* | 6/2024 | Oh ........................ H04N 19/30 |
| 12,069,316 | B2* | 8/2024 | Oh ........................ H04N 19/70 |
| 12,087,023 | B2* | 9/2024 | Sugio .................... H04N 19/63 |
| 12,113,963 | B2* | 10/2024 | Zhu ........................ G06T 9/001 |
| 12,149,717 | B2* | 11/2024 | Zhang .................... H04N 19/20 |
| 12,165,368 | B2* | 12/2024 | Oh ............................ G06T 9/40 |
| 12,167,032 | B2* | 12/2024 | Sugio .................... H04N 19/18 |
| 12,198,392 | B2* | 1/2025 | Iguchi ..................... G06T 9/001 |
| 2014/0270476 | A1 | 9/2014 | Cameron et al. |
| 2017/0214943 | A1 | 7/2017 | Cohen et al. |
| 2017/0347100 | A1 | 11/2017 | Chou et al. |
| 2017/0347122 | A1 | 11/2017 | Chou et al. |
| 2019/0394496 | A1 | 12/2019 | Tourapis et al. |
| 2020/0021844 | A1 | 1/2020 | Yea et al. |
| 2020/0143568 | A1 | 5/2020 | Lasserre et al. |
| 2020/0396489 | A1 | 12/2020 | Flynn et al. |
| 2020/0413080 | A1 | 12/2020 | Lasserre et al. |
| 2021/0004992 | A1 | 1/2021 | Flynn et al. |
| 2021/0327099 | A1 | 10/2021 | Van der Auwera et al. |
| 2022/0351423 | A1 | 11/2022 | Martin-Cocher et al. |
| 2025/0063196 | A1* | 2/2025 | Sugio ....................... G06T 9/001 |

FOREIGN PATENT DOCUMENTS

| | | |
|---|---|---|
| CN | 106846425 A | 6/2017 |
| CN | 110418135 A | 11/2019 |
| CN | 110572655 A | 12/2019 |
| CN | 110915219 A | 3/2020 |
| CN | 111145090 A | 5/2020 |
| CN | 111615791 A | 9/2020 |
| CN | 111615792 A | 9/2020 |
| CN | 111699697 A | 9/2020 |
| CN | 114503440 A | 5/2022 |
| EP | 3 514 967 A1 | 7/2019 |
| EP | 3 595 180 A1 | 1/2020 |
| JP | 2018101404 A | 6/2018 |
| JP | 2021528917 A | 10/2021 |
| JP | 2022504344 A | 1/2022 |
| RU | 2267161 C2 | 12/2005 |
| WO | WO 2017/209961 A1 | 12/2017 |
| WO | WO 2019/140508 A1 | 7/2019 |
| WO | WO 2019/140510 A1 | 7/2019 |
| WO | WO 2019/195922 A1 | 10/2019 |
| WO | WO 2020/072665 A1 | 4/2020 |

OTHER PUBLICATIONS

European Patent Office, Office Action Issued in Application No. 20196653.8, Jan. 26, 2024, Germany, 7 pages.

Wei Zhang et al:"[G-PCC] [new proposal] Planar coding improvement", 130.MPEG Meeting; Apr. 20, 2020-Apr. 24, 2020; XP030287104, No. m53522, Apr. 23, 2020, 5 pages.

Japanese Patent Office, Office Action Issued in Application No. 2022-579816, Mar. 5, 2024, 9 pages. (Submitted with Machine Translation).

State Intellectual Property Office of the People's Republic of China, Office Action and Search Report Issued in Application No. 2022107881419, Mar. 29, 2024, 16 pages. (Submitted with Machine Translation).

Notice of Reasons for Refusal issued in Japanese Application No. 2022-578799, dated Aug. 10, 2023, 4 pages.

Notice about the results of checking the patentability of an invention issued in Russian Application No. 2022133674/28(073328), dated Aug. 8, 2023, 16 pages.

Intellectual Property India, Office Action Issued in Application No. 202247074337, Apr. 24, 2023, 5 pages.

ISA State Intellectual Property Office of the People's Republic of China, Written Opinion of the International Searching Authority Issued in Application No. PCT/CN2020/098267, Nov. 11, 2020, WIPO, 6 pages.

ISA State Intellectual Property Office of the People's Republic of China, Written Opinion of the International Searching Authority Issued in Application No. PCT/CN2020/098272, Nov. 11, 2020, WIPO, 6 pages.

ISA State Intellectual Property Office of the People's Republic of China, Written Opinion of the International Searching Authority Issued in Application No. PCT/CN2020/119829, Jun. 29, 2021, WIPO, 5 pages.

ISA State Intellectual Property Office of the People's Republic of China, International Search Report issued in Application No. PCT/CN2020/098272, Nov. 11, 2020, WIPO, 2 pages.

State Intellectual Property Office of the People's Republic of China, Office Action and Search Report issued in Application No. 202080003877.X, Nov. 3, 2021, 9 pages.

State Intellectual Property Office of the People's Republic of China, Office Action and Search Report issued in Application No. 202080003878.4, Nov. 3, 2021, 14 pages.

ISA State Intellectual Property Office of the People's Republic of China, International Search Report issued in Application No. PCT/CN2020/098267, Nov. 11, 2020, WIPO, 4 pages.

ISA State Intellectual Property Office of the People's Republic of China, International Search Report issued in Application No. PCT/CN2020/119829, Jun. 29, 2021, WIPO, 5 pages.

European Patent Office, Extended European Search Report Issued in Application No. 20196648.8, Mar. 1, 2021, 8 pages.

European Patent Office, Extended European Search Report Issued in Application No. 20196653.8, Mar. 1, 2021, 13 pages.

Ke Zhang et al., "Hierarchical Segmentation Based Point Cloud Attribute Compression" "2018 IEEE International Conference on Acoustics, Speech, and Signal Processing (ICASSP)", Dec. 31, 2018, 5 pages.

Eduardo Pavez et al., "Dynamic Polygon Cloud Compression" "IEEE", Mar. 5, 2017, 6 pages.

Sebastien Lasserre et al., "[GPCC] [CE 13.22 related] An improvement of the planar coding mode", "128.MPEG meeting No. m50642", Oct. 11, 2019, 3 pages.

Sebastien Lasserre et al., "[GPCC] Planar mode in octree-based geometry coding" "127.MPEG meeting No. m48906", Jul. 12, 2019, 33 pages.

Antoine Dricot et al., "Adaptive Multi-level Triangle Soup for Geometry-based Point Cloud Coding", "2019 IEE 21st International Workshop on Multimedia Signal Processing (MMSP)", Dec. 31, 2019, 6 pages.

Lasserre (Blackberry)S et al., "On an improvement of RAHT to exploit attribute correlation", "126. MPEG Meeting; Mar. 25, 2019-Mar. 29, 2019; Geneva; (Motion Picture Expert Group or ISO/IEC JTC1/SC29/WG11), No. m47378, XP030211360", Mar. 20, 2019, 28 pages.

3DG, "G-PCC codec description" "128.MPEG Meeting; Oct. 7, 2019-Oct. 11, 2019; Geneva; (Muiuinpicture Expert Group or ISO/IEC JTC1/SC29/WG11), No. n18891, XP030225589" Dec. 18, 2019, 74 pages.

(56) References Cited

OTHER PUBLICATIONS

Sebastien Lasserre et al., "Entropy coding an octree node occupancy depending on neighbour's child nodes (TM3)", "124.MPEG Macau, m44753", Oct. 2018, 29 pages.

Khaled Mammou et al., "Adaptive Distance-based Prediction in TMC3", "Apple Inc., ISO/IEC JTC1/SC29/WG11 MPEG2018/m42642, San Diego, US", Apr. 2018, 3 pages.

Office Action issued by the Intellectual Property India on Mar. 27, 2025, in corresponding Application No. IN 202247074338, 7 pages.

Non-final Office Action issued by the U.S. Patent and Trademark Office on May 20, 2025, in U.S. Appl. No. 18/000,919, 23 pages.

\* cited by examiner

METHOD FOR ENCODING AND DECODING A POINT CLOUD

CROSS REFERENCE TO RELATED APPLICATIONS

The present application is a U.S. National Stage of International Application No. PCT/CN2020/098272 filed on Jun. 24, 2020, the contents of which are incorporated herein by reference in its entireties for all purposes.

FIELD

The present application generally relates to compression of attributes of points of a point cloud, preferably, the present application relates to a method of encoding and decoding, as well as an encoder and decoder for improved coding of attributes of a point cloud.

BACKGROUND

As an alternative to 3D meshes, 3D point clouds have recently emerged as a popular representation of 3D media information. Use cases associated with point cloud data are very diverse and include:
- 3D assets in movie production,
- 3D assets for real-time 3D immersive telepresence or VR applications,
- 3D free viewpoint video (for instance for sports viewing),
- Geographical Information Systems (cartography),
- Culture heritage (storage of fragile assets in digital form),
- Autonomous driving (large scale 3D mapping of environment) . . . .

A point cloud is a set of points in a 3D space, each with associated attributes, e.g. color, material properties, etc. Point clouds can be used to reconstruct an object or a scene as a composition of such points. They can be captured using multiple cameras and depth sensors in various setups and may be made up of thousands up to billions of points in order to realistically represent reconstructed scenes.

For each points of a point cloud, its position (usually an X, Y, Z information coded as a floating point with 32 or 64 bits) and its attributes (usually at least an RGB color coded in 24 bits) need to be stored. With sometimes billions of points in a point cloud, one can easily understand that the raw data of a point cloud can be several Gigabytes of data: hence, there is a strong need for compression technologies so as to reduce the amount of data required to represent a point cloud.

Two different approaches were developed for point cloud compression:

First, in the Video based Point Cloud Compression (VPCC) approach, a point cloud is compressed by performing multiple projections of it on the 3 different axis X, Y, Z and on different depths so that all points are present in one projected image. Then the projected images are processed into patches (to eliminate redundancy) and re-arranged into a final picture where additional metadata is used to translate pixels positions into point positions in space. The compression is then performed using traditional image/video MPEG encoders. The advantage of this approach is that it reuses existing coders and it naturally supports dynamic point clouds (using video coders) but this is hardly usable for scarce point clouds and it is expected that the compression gain would be higher with point clouds dedicated methods.

Second, in the Geometry based Point Cloud Compression (GPCC) approach, points positions (usually referred to as the geometry) and attributes (color, transparency . . . ) of the respective points are coded separately. In order to code the geometry, an octree structure is used. The whole point cloud is fitted into a cube which is continuously split into eight sub-cubes until each of the sub-cubes contains only a single point. The position of the points is therefore replaced by a tree of occupancy information at every node.

Attributes might be coded by Region-Adaptive Hierarchal Transform (RAHT). RAHT is known for example from U.S. Pat. No. 10,223,810 B2 and is a two-point transform with respect to a hierarchy defined by the Morton codes of the voxel locations. It is recursively performed on depths in the octree from bottom to top, e.g. from the leaves of the octree to the root. At each depth in the tree, it loops on each node. For each node, it loops on three direction. Therein, DC coefficients or high pass coefficients are kept for the next step while AC coefficients or low pass coefficients are quantized and encoded into the bitstream.

It is an object of the present invention to provide an efficient encoding and decoding method, as well as an encoder and decoder to provide improved compression of attributes of a point cloud.

SUMARRY

In an aspect of the present disclosure, a method for encoding attributes of points of a point cloud is provided to generate a bitstream of compressed point cloud data, wherein the point cloud's geometry is represented by a voxel-based structure with a plurality of nodes having parent-child relationships by recursively splitting a volumetric space containing the point cloud into sub-volumes each associated with a node of the voxel-based structure, comprising the steps:

Determining a true transform coefficient by applying Region-Adaptive Hierarchal Transform (RAHT) to the attributes of a present node;

Determining a difference between the attributes of a present parent node and each parent node of a first set of parent nodes sharing a face or an edge with the present node, wherein the present parent node is the parent node of the present node;

Selecting a second set from the first set of parent nodes according to the difference, wherein preferably the second set of parent nodes includes the present parent node;

Determining a predicted value for the attributes of the present node according to the attributes of the second set of parent nodes;

Determining a predicted transform coefficient by applying RAHT to the predicted value of the attributes of the present node;

Determining a residual from the true transform coefficient and the predicted transform coefficient; and Encoding the residual to produce encoded data of attributes of the point cloud for the bitstream.

Therein, for encoding the present node to be encoded true transform coefficients are determined by applying RAHT to the attributes of the present node. Further, predicted values for the attributes of the present node to be decoded are determined and RAHT is again applied to the predicted values to determine predicted transform coefficients of the attributes of the present node.

From predicted transform coefficients and the true transform coefficients the residual is determined, and the residual is included preferably by entropy encoding into the bitstream to produce encoded data of attributes of the point.

Therein, for determining the predicted value of the attributes of the present node a difference between the attributes of the parent node of the present node, being denoted as present parent node, and each node of a first set of nodes, sharing a face or an edge with the present node to be coded, are determined. Therein, the set of nodes sharing a face or an edge with the present node contains always six nodes. From the set of six nodes a second set is selected according to the difference determined. Preferably, also the present parent node is included into the second set. Thus, the second set may include one to seven parent nodes (being at level D-1 in the tree structure) in order to predict the predicted value for the attributes of the present node (being at the level D in the tree structure). From the predicted value a predicted transform coefficient is determined by applying RAHT, wherein the predicted transform coefficient is used to determine the residual for the attribute of the present node.

Therein, the aforementioned steps are repeated from root to the leaves of the tree for each occupied node in order to determine residuals for each occupied node in the tree structure. The residuals are then encoded and preferably entropy encoded into the bitstream.

Thus, for determining of the predicted value not always all parent nodes sharing a face or an edge with the present node are considered. Only those parent nodes in the first set of parent nodes are considered according to the difference of attributes between each of the parent nodes of the first set of parent nodes and the present parent node. Thus, not all parent nodes of the first set of parent nodes and the present parent node need to be selected. As a consequence, an improved prediction value can be determined, in particular, if significant variations in the parent nodes are present. Then, parent nodes deviating too much from the true value of the attribute of the present node are excluded according to the difference for predicting the predicted value.

Thus, the predicted value of the attribute of the present node is closer to the original or true value of the attribute of the present node, thereby reducing the residual. Hence, smaller residuals must be included into the bitstream enhancing efficiency of the coding of the attribute.

Preferably, determining the difference between the attributes of the present parent node and each parent node of the first set of parent nodes includes:
Determining the maximum difference among each of the parent nodes in the first set of parent nodes and the present parent node to quantify homogeneity of attributes across all nodes;
Providing a first threshold; and
If the maximum difference is smaller than the first threshold (i.e if attribute values are quite homogeneous between all nodes), selecting all parent nodes of the first set of parent nodes.

Thus, if the maximum difference among each of the parent nodes in the first set of nodes and the present node is smaller than the provided first threshold, the respective parent nodes appear to belong to homogenous region in the point cloud and thus can all be selected to be in the second set and used for predicting the predicted value of the attribute of the present node. Thus, in a homogenous region of the point cloud, all parent nodes sharing a face or an edge with the present node as well as the present parent node are used for predicting the predicted value.

Preferably, determining the difference between the attributes of the present parent node and each parent node of the first set of parent nodes includes:
Determining the difference between the attributes of each of the parent nodes in the first set of parent nodes and the present parent node to quantify the heterogeneity of attribute values across all nodes;
Providing a second threshold; and
Selecting parent nodes of the first set of parent nodes if the respective difference is smaller than the second threshold.

Thus, for each node i in the first set of parent nodes a difference $deltaAttr_i$ is determined and compared to the second threshold. If the difference for a specific note i is smaller than the second threshold, this node is selected to be in the second set and considered for predicting the predicted value of the attribute of the present node. Hence, only those nodes are selected which do not differ too much, i.e. more than by the given second threshold. Hence, in particular in an inhomogeneous region of attributes in the point cloud, parent nodes having deviating attributes are therefore excluded in determining the predicted value of the attributes of the present node. Thereby, the deviation between the predicted value and the true value of the attribute of the present node is reduced, providing a more accurate predicted value and thereby reducing the residuals to be coded into the bitstream.

Preferably, the first threshold is fixed and known by the encoder and decoder. Alternatively or additionally, the second threshold is fixed. Thus, the first threshold and/or the second threshold can be implemented in the encoder or decoder and does not need to be coded into the bitstream.

Preferably, the first threshold is determined according to the distribution of the attributes of the complete point cloud. Thus, for a more homogenous distribution of the attributes within the point cloud, the first threshold may be lower. Alternatively or additionally, the second threshold is determined according to the distribution of the attributes within the complete point cloud. Therein, the first threshold and/or the second threshold might be included into the bitstream for each point cloud for example into the metadata. Thus, the first threshold and/or the second threshold is fixed for the complete point cloud but may differ between two subsequent point clouds.

Preferably, the first threshold and/or the second threshold are determined according to the first set of parent nodes. Thus, for each of the present node an individual first threshold and/or individual second threshold can be determined and thus adapted to the specific variation of attributes around the present node. Therein, the first threshold and/or second threshold might be included into the bitstream to be forwarded from the encoder to the decoder for decoding.

Preferably, the first threshold and/or the second threshold are determined according to the first set of parent nodes and is inherited by all sub-nodes until a different value for first threshold or second threshold is assigned to a subtree of the first set of parent nodes. Thus, for each of the present node an individual first threshold and/or individual second threshold can be determined and thus adapted to the specific variation of attributes around the present node. Therein, the first threshold and/or second threshold might be included into the bitstream to be forwarded from the encoder to the decoder for decoding at the top of the subtree it concerns or inherited (and therefore not included in the bitstream) for nodes that are not at the top of such subtrees.

Preferably, the second threshold is a percentage of the first threshold. Thus, if the first threshold is increased, the second threshold, being a percentage of the first threshold, is increased accordingly. Therein, the percentage might be fixed, determined according to the distribution of attributes within the complete point cloud or determined according to the distribution of attributes within the first set of parent nodes. Thus, either the first threshold or the second threshold is included into the bitstream to be forwarded from the encoder to the decoder together with the respective percentage.

Preferably, the first threshold and/or second threshold are determined according to the ratio between the attributes of the present node and the attributes of parent nodes of the first set of parent nodes. Therein, one of an average, a maximum value, a minimum value of the attributes of the parent nodes of the first set of parent nodes is determined and considered for the ratio. Alternatively, the ratio between the attributes of the present node and each of the attributes of parent nodes of the first set of parent nodes is utilized for determining the first threshold and/or the second threshold.

Preferably, the first threshold and/or the second threshold is included into the bitstream.

Preferably, the first threshold and/or the second threshold is included into the bitstream only at the top of at least one subtree of the voxel-based structure for which the first and/or second thresholds shall be used and are inherited by all nodes in the subtree for which there is no explicit signaling of another first or second threshold. Thus, the first threshold and second threshold are only included into the bitstream if updated and stay valid for the subtree as long as not updated. If the first threshold and/or second threshold is updated by signaling the first or second threshold in the bitstream, a new subtree starts with the updated thresholds.

Preferably, the first threshold and second threshold are equal. Alternatively, the first threshold and the second threshold are different.

In an aspect of the present disclosure, a method for decoding a bitstream of compressed point cloud data is provided to generate attributes of points in a reconstructed point cloud, wherein the point cloud's geometry is represented by a voxel-based structure with a plurality of nodes having parent-child relationships by recursively splitting a volumetric space containing the point cloud into sub-volumes each associated with a node of the voxel-bases structure, comprising the steps:

Decoding a residual of attributes of a present node of the point cloud from the bitstream;

Determining a difference between the attributes of a present parent node and each parent node of a first set of parent nodes sharing a face or an edge with the present node, wherein the present parent node is the parent node of the present node;

Selecting a second set from the first set of parent nodes according to the difference, wherein preferably the second set of parent nodes includes the present parent node;

Determining a predicted value for the attributes of the present node according to the attributes of the second set of parent nodes;

Determining a predicted transform coefficient by applying RAHT to the predicted value of the attributes of the present node; and Determining from the residual and the predicted transform coefficient the attributes of the present node by applying an inverse RAHT.

Preferably, the method of decoding is further built according to the features described above with respect to the method for encoding. These features can be freely combined with the method of decoding.

In an aspect of the present disclosure, an encoder is provided for encoding a point cloud to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, the encoder comprising:

a processor and a memory storage device, wherein in the memory storage device instructions executable by the processor are stored that, when executed, cause the processor to perform the method according to the above-described methods for encoding and decoding.

In an aspect of the present disclosure, a decoder is provided for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, the decoder comprising:

a processor and a memory storage device, wherein in the memory storage device instructions executable by the processor are stored that, when executed, cause the processor to perform the above-described method of decoding.

In an aspect of the present disclosure a non-transitory computer-readable storage medium is provided storing processor-executed instructions that, when executed by a processor, cause the processor to perform the above-described method of encoding and/or decoding.

BRIEF DESCRIPTION OF THE DRAWINGS

Reference will now be made, by way of example, to the accompanying drawings which show example embodiments of the present application, and in which the Figures show.

DETAILED DESCRIPTION

Figure 1:
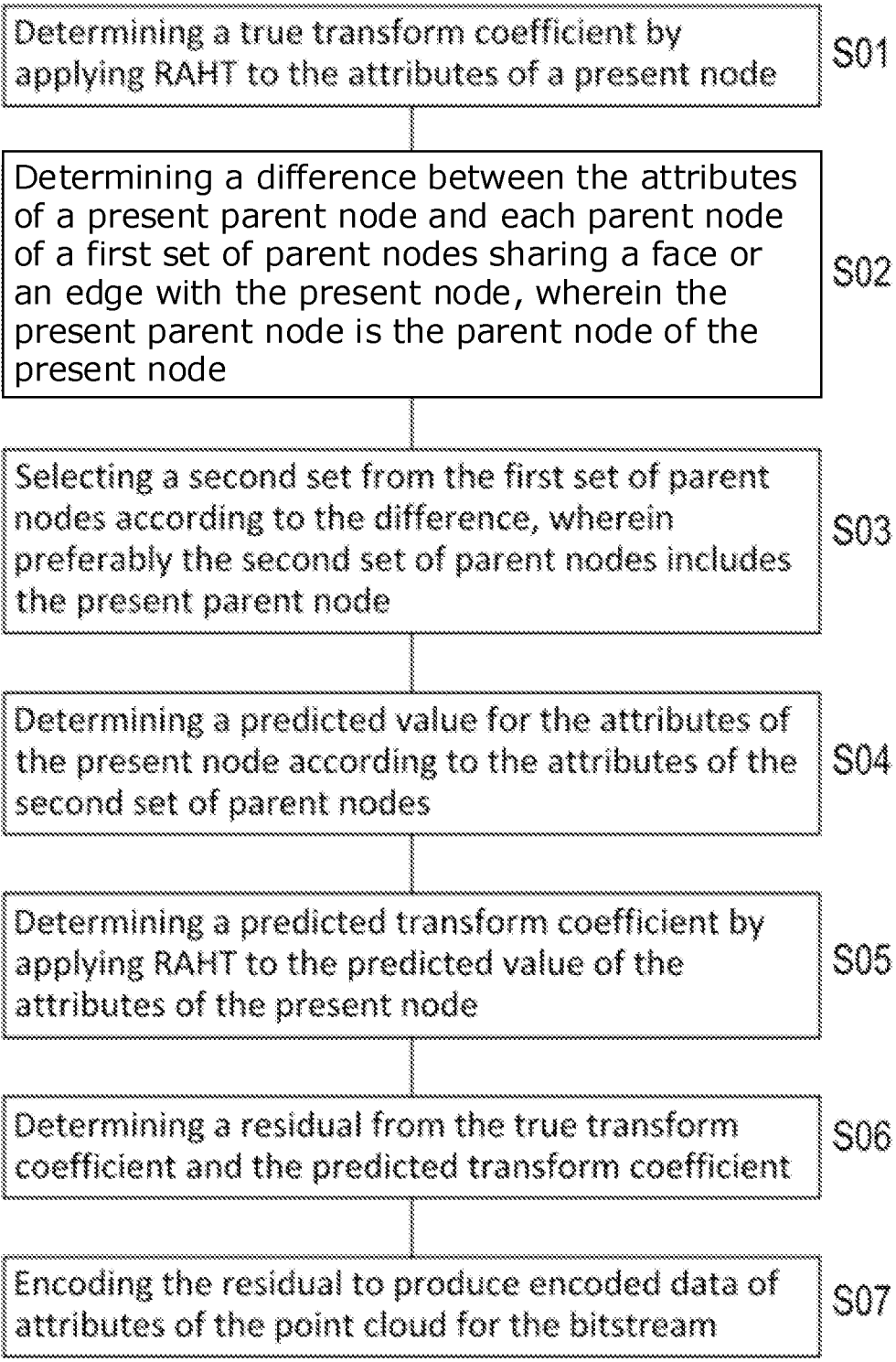
FIG. 1 an embodiment of the method of encoding according to the present invention, FIG. 2 an embodiment of the method of decoding according to the present invention, FIG. 3 an example for the steps of encoding according to the present invention, FIG. 4 an example for the steps of decoding according to the present invention, FIG. 5 an illustration for determining the predicted value according to the present invention, FIG. 6 a detailed embodiment of the present invention, FIG. 7 a detailed embodiment of the present invention, FIG. 8 a schematic illustration of an encoder device and FIG. 9 a schematic illustration of a decoder device.

The present application describes methods of encoding and decoding attributes of points in a point cloud, and encoders and decoders for encoding and decoding attributes of points in a point cloud.

The present invention relates to a method for encoding attributes of points of a point cloud to generate a bitstream of compressed point cloud data, wherein the point cloud's geometry is represented by a voxel-based structure with a plurality of nodes having parent-child relationships by recursively splitting a volumetric space containing the point cloud into sub-volumes each associated with a node of the voxel-based structure, comprising the steps:

Determining a true transform coefficient by applying Region-Adaptive Hierarchal Transform, RAHT, to the attributes of a present node;

Determining a difference between the attributes of a present parent node and each parent node of a first set of parent nodes sharing a face or an edge with the present node, wherein the present parent node is the parent node of the present node;

Selecting a second set from the first set of parent nodes according to the difference, wherein preferably the second set of parent nodes includes the present parent node;

Determining a predicted value for the attributes of the present node according to the attributes of the second set of parent nodes;

Determining a predicted transform coefficient by applying RAHT to the predicted value of the attributes of the present node;

Determining a residual from the true transform coefficient and the predicted transform coefficient; and Encoding the residual to produce encoded data of attributes of the point cloud for the bitstream.

Other aspects and features of the present application will be understood by those ordinary skill in the art from a review of the following description of examples in conjunction with the accompanying figures.

At times in the description below, the terms "node" and "sub-volume" may be used interchangeably. It will be appreciated that a node is associated with a sub-volume. The node is a particular point on the tree that may be an internal node or a leaf node. The sub-volume is the bounded physical space that the node represents. The term "volume" may be used to refer to the largest bounded space defined for containing the point cloud. The volume is recursively divided into sub-volumes for the purpose of building out a tree-structure of interconnected nodes for coding the point cloud data. Additionally, the term "parent node" refers to a node in the next higher level of the tree. While the node might be at the level or depth D in the tree, the parent node is a node at the level or depth D-1.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points have further associated attributes, such as color, which may also be a three-component value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-coloured and highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression of the attributes and geometry of such a point cloud, i.e. encoding and decoding processes, may hamper adoption and deployment.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on the resolution of the tree and/or whether there are any points contained in the sub-volume. A leaf node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used. A commonly-used tree structure is an octree. In this structure, the volumes/sub-volumes are all cubes and each split of a sub-volume results in eight further sub-volumes/sub-cubes.

The basic process for creating an octree to code a point cloud may include:

Start with a bounding volume (cube) containing the point cloud in a coordinate system;
1. Split the volume into 8 sub-volumes (eight sub-cubes);
2. For each sub-volume, mark the sub-volume with 0 if the sub-volume is empty, or with 1 if there is at least one point in it;
3. For all sub-volumes marked with 1, repeat (2) to split those sub-volumes, until a maximum depth of splitting is reached; and
4. For all leaf sub-volumes (sub-cubes) of maximum depth, mark the leaf cube with 1 if it is non-empty, 0 otherwise.

The tree may be traversed in a pre-defined order (breadth-first or depth-first, and in accordance with a scan pattern/order within each divided sub-volume) to produce a sequence of bits representing the occupancy pattern of each node.

As mentioned above points in the point cloud may include attributes. These attributes are coded independently from the coding of the geometry of the point cloud. Thus, each occupied node, i.e. node including at least one point of the point cloud is associated with one or more attributes in order to further specify the properties of the point cloud.

The present invention provides a method for encoding attributes of points of a point cloud. The method is shown in FIG. 1.

A method for encoding attributes of points of a point cloud is provided to generate a bitstream of compressed point cloud data, wherein the point cloud's geometry is represented by a voxel-based structure with a plurality of nodes having parent-child relationships by recursively splitting a volumetric space containing the point cloud into sub-volumes each associated with a node of the voxel-based structure, comprising the steps:

Determining 501 a true transform coefficient by applying Region-Adaptive Hierarchal Transform, RAHT, to the attributes of a present node;

Determining S02 a difference between the attributes of a present parent node and each parent node of a first set of parent nodes sharing a face or an edge with the present node, wherein the present parent node is the parent node of the present node;

Selecting S03 a second set from the first set of parent nodes according to the difference, wherein preferably the second set of parent nodes includes the present parent node;

Determining S04 a predicted value for the attributes of the present node according to the attributes of the second set of parent nodes;

Determining S05 a predicted transform coefficient by applying RAHT to the predicted value of the attributes of the present node;

Determining 306 a residual from the true transform coefficient and the predicted transform coefficient; and Encoding 507 the residual to produce encoded data of attributes of the point cloud for the bitstream.

Figure 3:
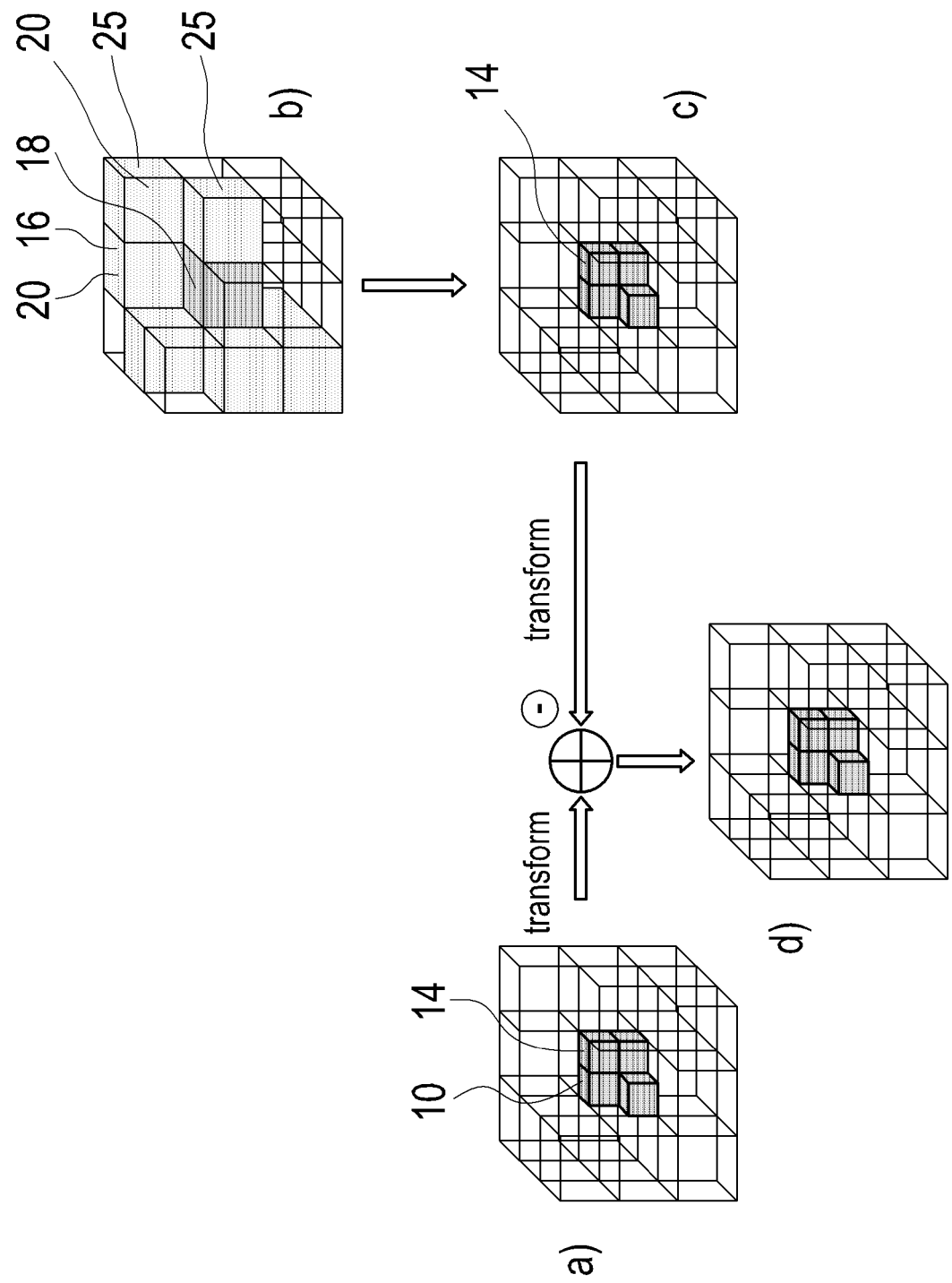

Referring to FIG. 3 illustrating the method of encoding attributes of a present node. In the example of FIG. 3, a certain number of occupied nodes 10 are depicted at level D of the octree structure 12. Unshaded cubes relate to unoccupied nodes. Therein, for example the attributes of the present node 14 shall be encoded into the bitstream at the present step. Therein, in picture a) of FIG. 3, the occupied nodes are represented by the true attributes. These true attributes of picture a) are transformed by Region-Adaptive Hierarchal Transform (RAHT) to obtain a true transform coefficient according to step S01. RAHT is well known for example from U.S. Pat. No. 10,223,810 B2 which is therefore included by reference in its entirety. Therein, in picture a) other parent nodes might contain further occupied nodes at level D which are omitted for the sake of clarity.

Further, according to picture b) of FIG. 3, the neighboring parent nodes 16 of the present parent node 18 are considered, wherein the present parent node 18 contains the present node 14 to be encoded. Thereby, in picture b) of FIG. 3 only those neighboring parent nodes 16 are shaded which are not empty, i.e. comprise at least one point of the point cloud. In general, there are six neighboring parent nodes sharing a face with the present parent node 18 and twelve neighboring parent nodes sharing an edge with the present parent node 18. One of these nodes, more than one of these nodes or all of these nodes might be empty or might include a point of the point cloud and therefore being not empty. Therein, the present parent node 18 and the neighbor parent nodes 16 are at a depth D-1 in the tree structure.

According to step S02, a difference between the attributes of the present parent node 18 and the occupied neighboring parent nodes are determined. However, the difference between the attributes of the present parent node 18 and the neighboring parent nodes 16 are not calculated for each present and occupied neighboring parent node 16. A first set of parent nodes includes only those neighboring parent nodes 16 sharing a face or an edge with the present node 14 at depth D in the tree structure. Thus, the first set of parent nodes may comprise a maximum of seven parent nodes, if all of these parent nodes are occupied by a point of the point cloud including the present parent node 18 itself. In the example of FIG. 3, for the present node 14 the first set comprises three neighboring parent nodes 20 (therein it is assumed that behind the present parent node 18 the neighboring parent node 16 is empty).

From the determined differences between the attributes of the present parent node 18 and the parent nodes 20 of the first set, a second set is selected according to the determined difference. In addition, the present parent node 18 is also included into the second set. In the example of FIG. 3, the second set might contain 1 to 4 nodes depending on the differences of attributes.

Figure 4:
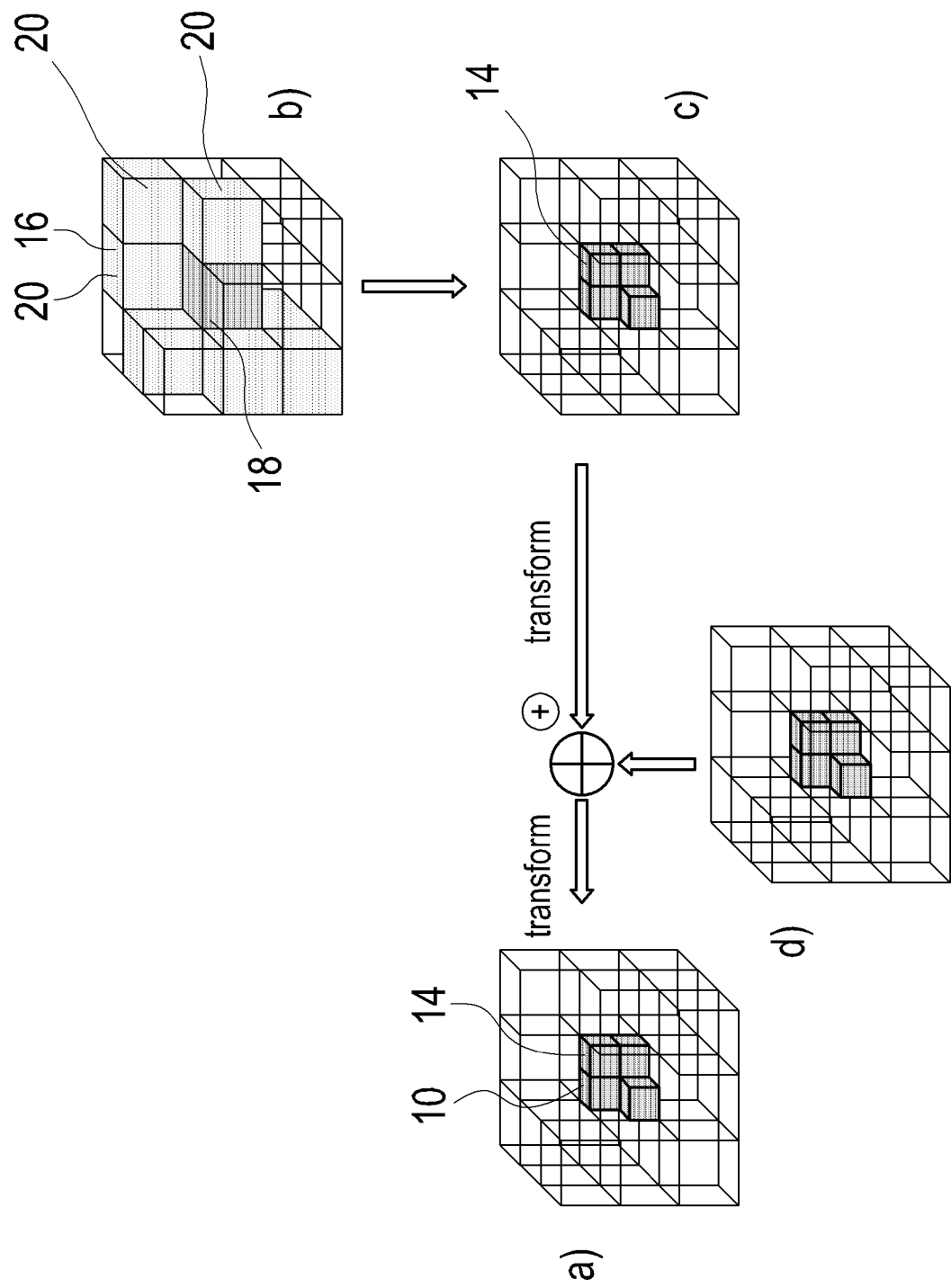
Figure 5:
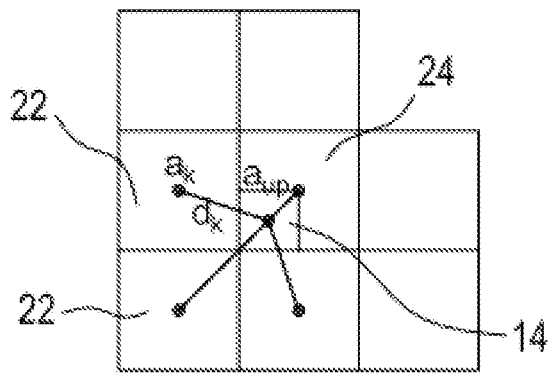

According to step S04 a predicted value for the attributes of the present node 14 are determine according to the attributes of the second set of parent nodes. Therein, FIG. 4 shows an embodiment of the step of determining the predicted value in 2D. In the example of 2D, the second set of parent nodes might only contain four parent nodes including the present parent node. For determining the predicted value of the attributes of the present node 14 in the example of FIG. 4, all neighboring parent nodes 22, sharing an edge or face with the present node 14 are considered, including the present parent node 24 of the present node 14. From the attributes $a_k$ of the parent nodes 22, 24 of the second set a weighted prediction is made for the predicted value $\alpha_{predicted}$ of the present node 14 according to $$\alpha_{predicted} = \sum\nolimits_k s_k^{-1} a_k / \sum\nolimits_k d_k^{-1},$$

wherein $d_k$ denotes the distance between the center of the present node 14 and the center of the respective parent node 22, 24. As mentioned above, in FIG. 4, all parent nodes of the second set are considered. However, the number of considered parent nodes might be less.

Referring back to FIG. 3. In picture c) of FIG. 3, the predicted value of the present node 14 is indicated. Therein, the above described steps are repeated for the other occupied nodes 10 in the present parent node 18. Thus, as indicated in picture c) of FIG. 3, for each occupied node 10 at depth D in the present parent node 18, a predicted value has been determined. Each predicted value is transformed by applying RAHT in order to obtain predicted transform coefficients for each of the occupied nodes 10 within the present parent node 18.

From the predicted transform coefficient and the true transform coefficient, residuals are determined for each of the nodes including the present node 14 according to step S06. The residuals are entropy encoded to produce encoded data of attributes for the bitstream according to step S07.

Thus, according to the difference between the present parent node 18 and the neighboring parent nodes 20 sharing a face or an edge with the present node 14, only those neighboring parent nodes 20 are selected in the second set having a sufficient small deviation from each other. Thereby, the residual for each of the nodes is reduced, improving the efficiency of encoding the attributes to the bitstream.

For example, if in picture b) of FIG. 3 the neighboring parent nodes 25 belong to an area of the point cloud with a different color deviating from the color of the present node 14, including these neighboring parent nodes in the step of determining the predicted value would result in a prediction failure increasing the residuals to be encoded. Thus, in this example, the neighboring parent nodes 25 from the first set of parent nodes would not be selected to be included into the second set and therefore the attributes of these parent nodes 25 would not be considered in the weighted prediction as described above.

Figure 2:
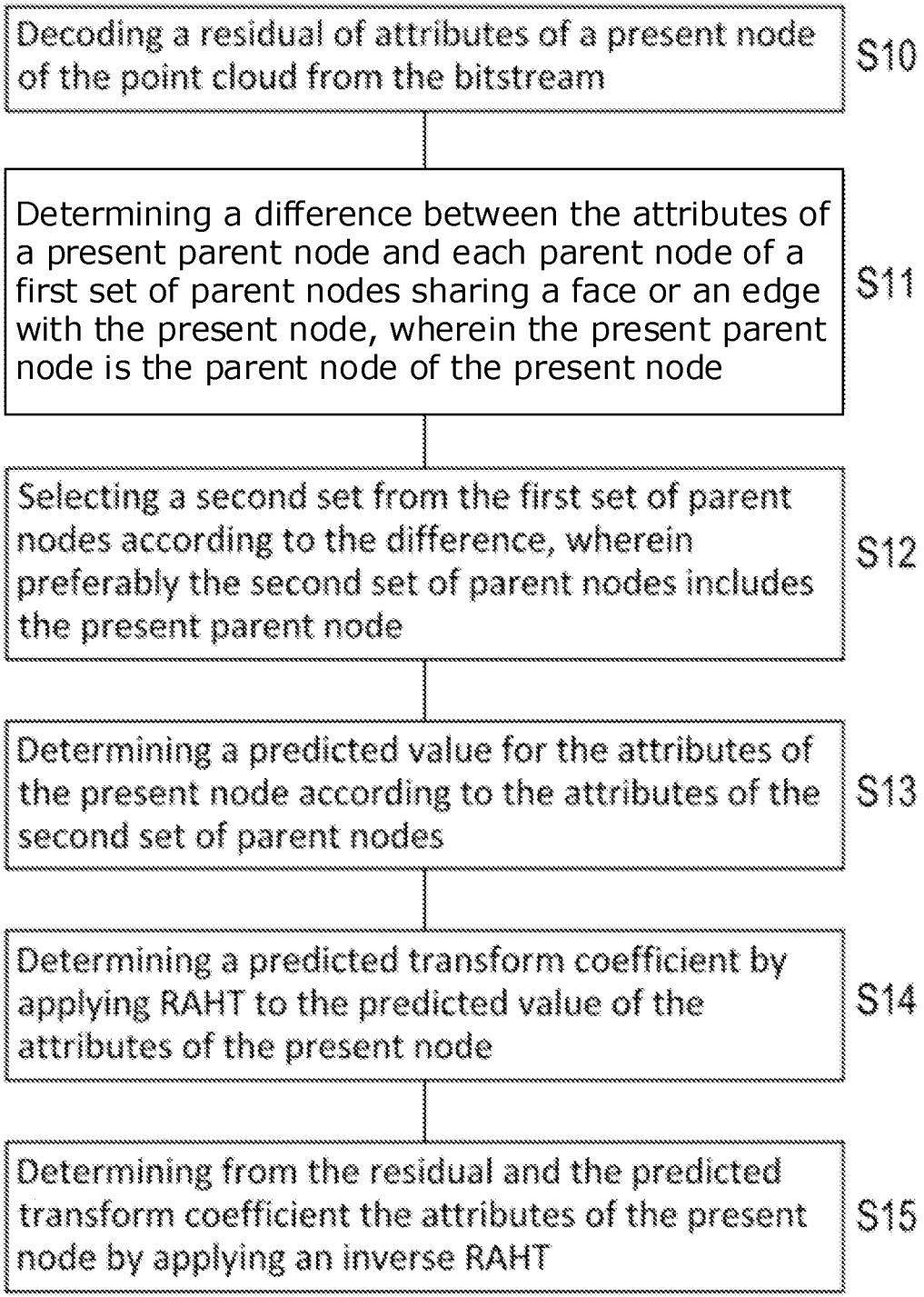

The present invention provides a method for decoding attributes of points of a point cloud. The method is shown in FIG. 2.

A method for decoding a bitstream of compressed point cloud data is provided to generate attributes of points in a reconstructed point cloud, wherein the point cloud's geometry is represented by a voxel-based structure with a plurality of nodes having parent-child relationships by recursively splitting a volumetric space containing the point cloud into sub-volumes each associated with a node of the voxel-bases structure, comprising the steps:

Decoding S10 a residual of attributes of a present node of the point cloud from the bitstream;

Determining S11 a difference between the attributes of a present parent node and each parent node of a first set of parent nodes sharing a face or an edge with the present node, wherein the present parent node is the parent node of the present node;

Selecting 512 a second set from the first set of parent nodes according to the difference, wherein preferably the second set of parent nodes in-cludes the present parent node;

Determining S13 a predicted value for the attributes of the present node according to the attributes of the second set of parent nodes;

Determining 314 a predicted transform coefficient by applying RAHT to the predicted value of the attributes of the present node; and Determining S15 from the residual and the predicted transform coefficient the attributes of the present node by applying an inverse RAHT.

The steps of the method of decoding the bitstream to obtain attributes of a present point in a point cloud are further depicted in FIG. 4 wherein the residuals represented in picture d) of FIG. 4 are provided by the decoded bitstream. These residuals are combined with the predicted values wherein the prediction, depicted in pictures b) and c) of FIG. 4 are identical to the steps of the respective encoding described above. Therein, it should be noted that decoding is performed from the root the leaves. Thus, the attributes of the parent node in depth D-1, sharing a face or an edge with the present node 14 are already known.

From the predicted value transformed by a RAHT and the residuals provided by decoding the bitstream, the attributes of the present node 14 is obtained by inverse RAHT.

Figure 6:
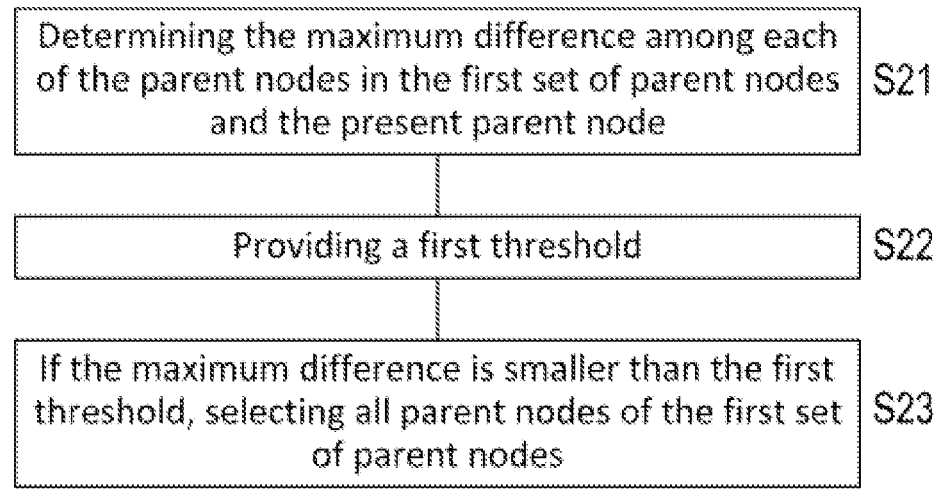

Referring to FIG. 6, showing a detailed embodiment. Therein, determining the difference between the attributes of the present parent node and each parent node of the first set of parent nodes includes:

Determining S21 the maximum difference among each of the parent nodes in the first set of parent nodes and the present parent node;

Providing 522 a first threshold; and

If the maximum difference is smaller than the first threshold, selecting S23 all parent nodes of the first set of parent nodes.

Thus, by determining the maximum difference among each of the parent nodes in the first set of parent nodes and the present parent node, a homogeneity of the considered volume in the point cloud is determined. Thus, if the difference is smaller than the first threshold, the attributes are homogeneous enough to be all considered to predict the predicted value of the attributes of the present node 14.

Figure 7:
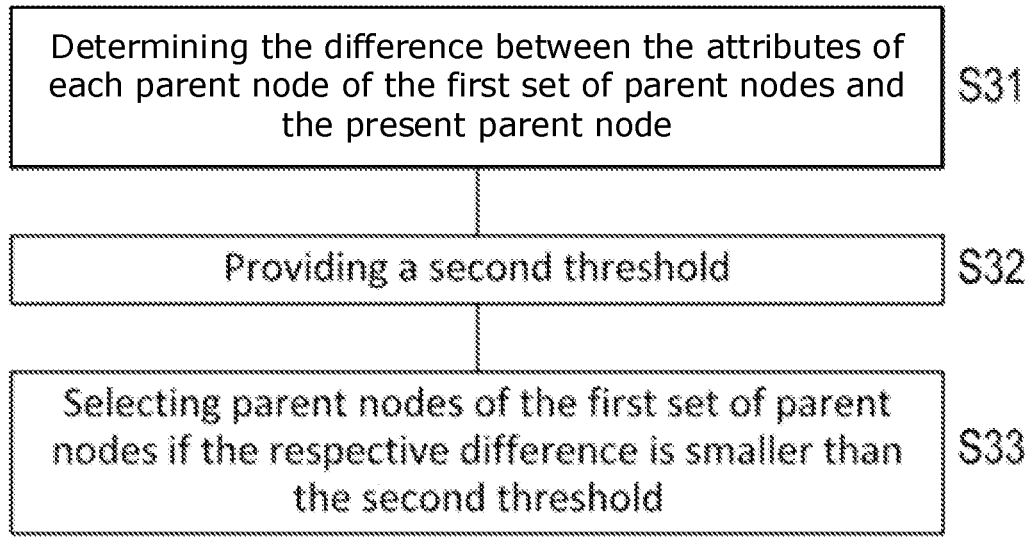

Referring to FIG. 7, showing a detailed embodiment. Therein, determining the difference between the attributes of the present parent node and each parent node of the first set of parent nodes includes:

Determining S31 the difference between the attributes of each parent node in the first set of parent nodes and the present parent node;

Providing S32 a second threshold; and

Selecting S33 parent nodes of the first set of parent nodes if the respective difference is smaller than the second threshold.

In particular, if the homogeneity of attributes in the considered volume of the point cloud, i.e. the maximum difference among each of the present nodes in the first set of parent nodes are above the first threshold a difference deltaAttr$_i$ for the attributes $\alpha_i$ of each of the parent nodes i in the first set of parent nodes and the attribute $\alpha_{PresentParentNode}$ of the present node are determined, wherein deltaAttr$_i$=$\alpha_i$-$\alpha_{PresentParentNode}$. Therein, those parent nodes in the first set of parent nodes are selected for which deltaAttr$_i$ is smaller than the second threshold.

Of course determining the difference between each of the parent nodes and the first set of parent nodes and the present parent node and comparing this difference with the second threshold in order to select parent nodes of the first set of parent nodes can be used independent of the determination of the homogeneity of the attributes in the considered volume as described before.

In one embodiment the first threshold is fixed. Thus, the fixed first threshold is known by the encoder and decoder and needs not to be included into the transmitted bitstream.

In one embodiment the second threshold is fixed. Thus, the fixed second threshold is known by the encoder and decoder and needs not to be included into the transmitted bitstream.

In one embodiment the first threshold is included into the bitstream to be forwarded from the encoder to the decoder.

In one embodiment the second threshold is included into the bitstream to be forwarded from the encoder to the decoder.

In one embodiment the first threshold is determined according to the distribution of attributes within the complete point cloud. Thus, for an inhomogeneous distribution of the attribute the first threshold can be adapted accordingly. Therein, the determined first threshold need to be transmitted only once per point cloud encoded into the bitstream for example into the metadata.

In one embodiment the second threshold is determined according to the distribution of attributes within the complete point cloud. Thus, for an inhomogeneous distribution of the attribute the second threshold can be adapted accordingly. Therein, the determined second threshold need to be transmitted only once per point cloud encoded into the bitstream for example into the metadata.

In one embodiment the first threshold is determined according to the first set of parent nodes. Thus, the first threshold can be individually adapted according to the attribute distribution among the parent nodes in the first set of parent nodes. In this case, an individual threshold for the step of predicting of each node individually can be provided and adapted accordingly in order to provide sufficient results. Alternatively, the first threshold can be determined according to an average of the attributes in the first set compared to the attribute of the present parent node. Alternatively, the first threshold can be determined according to a minimum value or maximum value of the attributes in the first set compared to the attribute of the present parent node. Therein, the first threshold needs to be included into the bitstream to be transmitted from the encoder to the decoder.

In one embodiment the second threshold is determined according to the first set of parent nodes. Thus, the second threshold can be individually adapted according to the attribute distribution among the parent nodes in the first set of parent nodes. In this case, an individual threshold for the step of predicting of each node individually can be provided and adapted accordingly in order to provide sufficient results. Alternatively, the second threshold can be determined according to an average of the attributes in the first set compared to the attribute of the present parent node. Alternatively, the second threshold can be determined according to a minimum value or maximum value of the attributes in the first set compared to the attribute of the present parent node. Therein, the second threshold needs to be included into the bitstream to be transmitted from the encoder to the decoder.

In one embodiment, the first threshold and/or the second threshold are determined according to the first set of parent nodes and is inherited by all sub-nodes until a different value for first threshold or second threshold is assigned to a subtree of the first set of parent nodes. Thus, for each of the present nodes an individual first threshold and/or individual second threshold can be determined and thus adapted to the specific variation of attributes around the present node. Therein, the first threshold and/or second threshold might be included into the bitstream to be forwarded from the encoder to the decoder for decoding at the top of the subtree it concerns or inherited (and therefore not included in the bitstream) for nodes that are not at the top of such subtrees.

In one embodiment the second threshold is a percentage of the first threshold. Thus, if the first threshold is increased, the second threshold, being a per-centage of the first threshold, is increased accordingly. Therein, the percentage might be fixed, determined according to the distribution of attributes within the complete point cloud or determined according to the distribution of attributes within the first set of parent nodes. Therein, the first threshold is included into the bitstream and the percentage. If either the first threshold or the percentage is fixed, this information need not to be transmitted and thus only the remaining must be included.

In one embodiment the first threshold and the second threshold are set to be equal. In another embodiment the first threshold and the second threshold are different.

In one embodiment the first threshold is determined according to the ratio between attributes of the present node and the attributes of patent nodes of the first set of parent nodes. Therein, this ration can be determined according to the average, the maximum value or minimum value of the attributes in the first set of parent nodes. Alternatively, the first threshold can be determined individually for each of the parent nodes in the first set of parent nodes as a ratio of the attributes of the present parent node and the respective parent node of the first set of parent nodes.

In one embodiment the second threshold is determined according to the ratio between attributes of the present node and the attributes of patent nodes of the first set of parent nodes. Therein, this ration can be determined according to the average, the maximum value or minimum value of the attributes in the first set of parent nodes. Alternatively, the second threshold can be determined individually for each of the parent nodes in the first set of parent nodes as a ratio of the attributes of the present parent node and the respective parent node of the first set of parent nodes.

Different embodiments can be freely combined. In particular, different definitions of the first threshold and second threshold can be freely selected from the above embodiments and tailored to the needs of the specific application.

Thus, in accordance to the present invention, the attribute distribution/deviation is considered upon predicting predicted values for the present node to be coded. Thus, not all possible information is considered. Instead only those information is considered for determining the prediction value which is sufficiently similar to the attributes of the present node to be coded. Thereby prediction errors are reduced, inhomogeneities in the attribute distribution within the point cloud are well considered and do not lead to increase of prediction errors. As a consequence, due to the reduced prediction errors, also the residuals are reduced, increasing the efficiency of encoding these residuals into the bitstream of the point cloud.

Thereby, significant data reduction of at least one percent can be achieved with respect to prior encoding methods for encoding the attributes of a point cloud.

| Results under C1 test condition | | | | |
|---|---|---|---|---|
| | Luma | Chroma Cb | Chroma Cr | Reflectance |
| Cat-A sequences | −0.7% | −0.8% | −0.9% | N/A |
| Cat3-fused sequences | −2.8% | −1.9% | −1.8% | −1.0% |
| average | −1.0% | −0.9% | −1.0% | −1.0% |

| Results under C2 test condition | | | | |
|---|---|---|---|---|
| | Luma | Chroma Cb | Chroma Cr | Reflectance |
| Cat-A sequences | −0.7% | −0.5% | −0.5% | N/A |
| Cat3-fused sequences | −1.1% | −1.3% | −1.3% | −0.7% |
| average | −0.7% | −0.6% | −0.6% | −0.7% |

The simulations represented in the table above were executed on the latest TMC13v10 platform with fixed values for both threshold, i.e. the first threshold and the second threshold, across all sequences.

Figure 8:
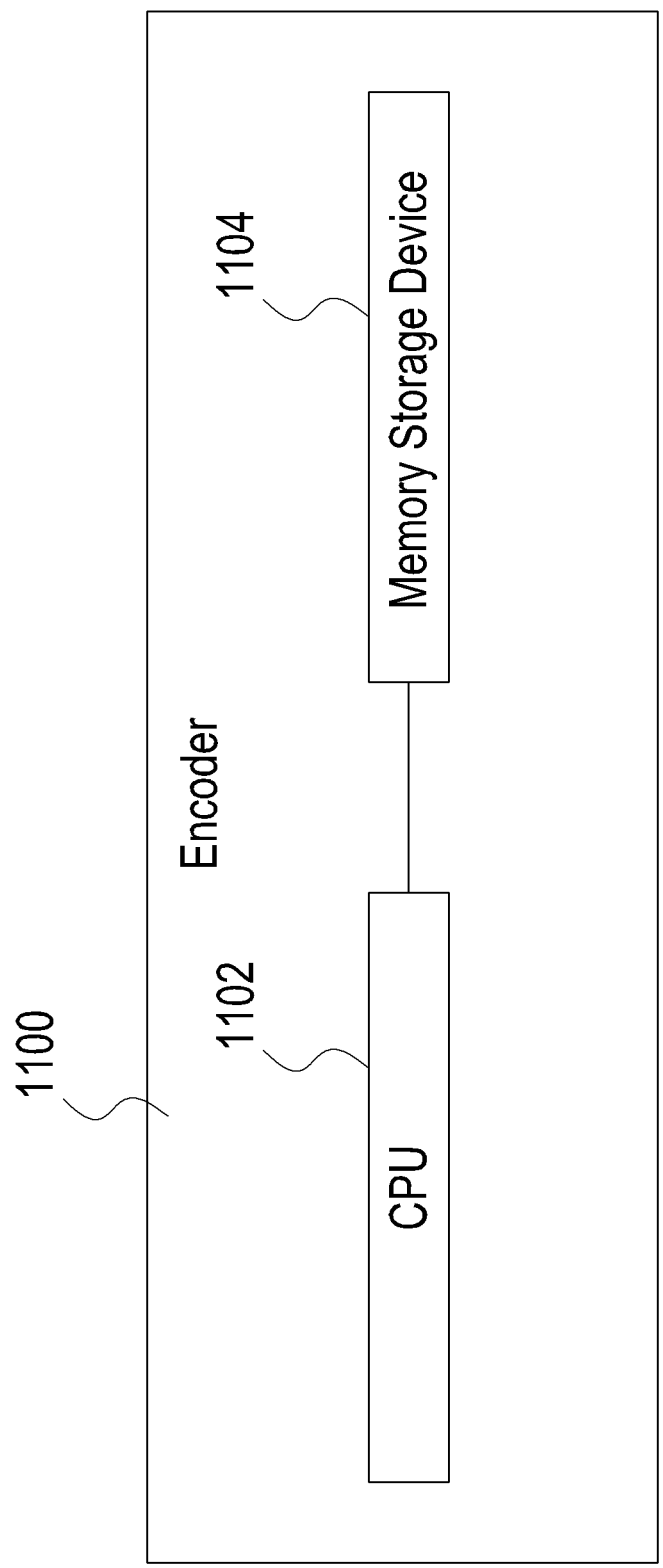

Reference is now made to FIG. 8, which shows a simplified block diagram of an example embodiment of an encoder 1100. The encoder 1100 includes a processor 1102 and a memory storage device 1104. The memory storage device 1104 may store a computer program or application containing instructions that, when executed, cause the processor 1102 to perform operations such as those described herein. For example, the instructions may encode and output bitstreams encoded in accordance with the methods described herein. It will be understood that the instructions may be stored on a non-transitory computer-readable medium, such as a compact disc, flash memory device, random access memory, hard drive, etc. When the instructions are executed, the processor 1102 carries out the operations and functions specified in the instructions so as to operate as a special-purpose processor that implements the described process(es). Such a processor may be referred to as a "processor circuit" or "processor circuitry" in some examples.

Figure 9:
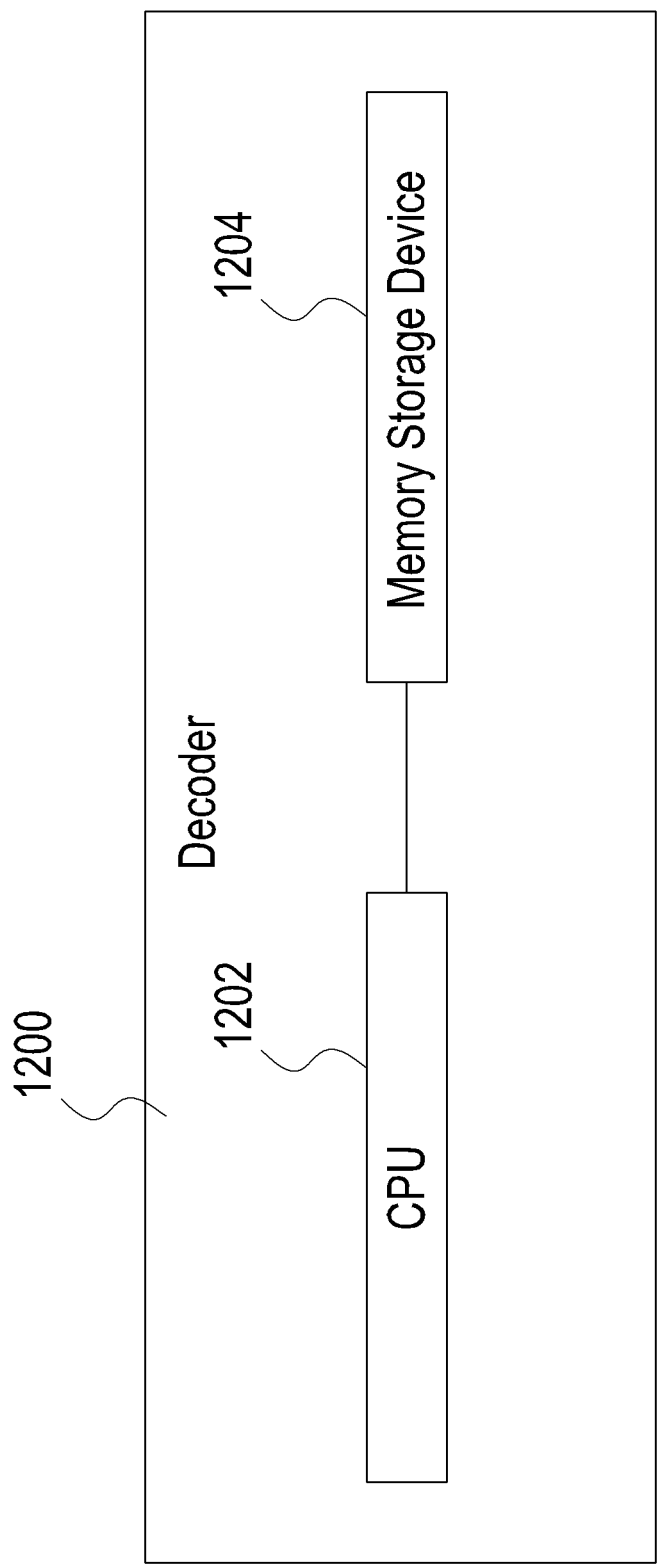

Reference is now also made to FIG. 9, which shows a simplified block diagram of an example embodiment of a decoder 1200. The decoder 1200 includes a processor 1202 and a memory storage device 1204. The memory storage device 1204 may include a computer program or application containing instructions that, when executed, cause the processor 1202 to perform operations such as those described herein. It will be understood that the instructions may be stored on a computer-readable medium, such as a compact disc, flash memory device, random access memory, hard drive, etc. When the instructions are executed, the processor 1202 carries out the operations and functions specified in the instructions so as to operate as a special-purpose processor that implements the described process(es) and methods. Such a processor may be referred to as a "processor circuit" or "processor circuitry" in some examples.

It will be appreciated that the decoder and/or encoder according to the present application may be implemented in a number of computing devices, including, without limitation, servers, suitably programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive. In particular, embodiments can be freely combined with each other.

The invention claimed is:

1. A method for encoding attributes of points of a point cloud to generate a bitstream of compressed point cloud data, wherein the point cloud's geometry is represented by a voxel-based structure with a plurality of nodes having parent-child relationships by recursively splitting a volumetric space containing the point cloud into sub-volumes each associated with a node of the voxel-based structure, the method comprising:
   determining a true transform coefficient by applying Region-Adaptive Hierarchal Transform (RAHT), to attributes of a present node;
   determining a difference between attributes of a present parent node and each parent node of a first set of parent nodes sharing a face or an edge with the present node, wherein the present parent node is the parent node of the present node;
   selecting a second set of parent nodes from the first set of parent nodes according to the difference, wherein the second set of parent nodes includes the present parent node;
   determining a predicted value for the attributes of the present node according to attributes of the second set of parent nodes;
   determining a predicted transform coefficient by applying the RAHT to the predicted value of the attributes of the present node;
   determining a residual from the true transform coefficient and the predicted transform coefficient; and
   encoding the residual to produce encoded data of attributes of the point cloud for the bitstream.

2. The method according to claim 1, wherein determining the difference between the attributes of the present parent node and each parent node of the first set of parent nodes includes:
   determining a maximum difference among each parent node of the first set of parent nodes and the present parent node;
   providing a first threshold; and
   if the maximum difference is smaller than the first threshold, selecting all parent nodes of the first set of parent nodes.

3. The method according to claim 1, wherein determining the difference between the attributes of the present parent node and each parent node of the first set of parent nodes includes:
   determining a difference between the attributes of each of the parent nodes in the first set of parent nodes and the present parent node;
   providing a second threshold; and
   selecting parent nodes of the first set of parent nodes if the respective difference is smaller than the second threshold.

4. The method according to claim 3, wherein at least one of the first threshold or the second threshold is fixed.

5. The method according to claim 3, wherein at least one of the first threshold or the second threshold is determined according to a distribution of the attributes within the complete point cloud.

6. The method according to claim 3, wherein at least one of the first threshold or the second threshold is determined according to the first set of parent nodes.

7. The method according to claim 3, wherein the second threshold is a percentage of the first threshold.

8. The method according to claim 3, wherein at least one of the first threshold and/or or the second threshold is determined according to a ration between the attributes of the present node and the attributes of parent nodes of the first set of parent nodes.

9. The method according to claim 3, wherein at least one of the first threshold and or the second threshold is included into the bitstream.

10. The method according to claim 9, wherein at least one of the first threshold or the second threshold is included into the bitstream only at the top of at least one subtree for which the at least one of the first threshold or the second threshold is used and is inherited by all nodes in the subtree for which there is no explicit signaling of another first or second threshold.

11. An encoder for encoding attributes of points of a point cloud to generate a bitstream of compressed point cloud data, wherein the point cloud's geometry is represented by a voxel-based structure with a plurality of nodes having parent-child relationships by recursively splitting a volumetric space containing the point cloud into sub-volumes each associated with a node of the voxel-based structure, the encoder comprising:
   a processor; and
   a memory storage device storing instructions executable by the processor,
   wherein the processor is configured to:
   determine a true transform coefficient by applying Region-Adaptive Hierarchal Transform (RAHT) to attributes of a present node;

determine a difference between attributes of a present parent node and each parent node of a first set of parent nodes sharing a face or an edge with the present node, wherein the present parent node is the parent node of the present node;

select a second set of parent nodes from the first set of parent nodes according to the difference, wherein the second set of parent nodes includes the present parent node;

determine a predicted value for the attributes of the present node according to attributes of the second set of parent nodes;

determine a predicted transform coefficient by applying the RAHT to the predicted value of the attributes of the present node;

determine a residual from the true transform coefficient and the predicted transform coefficient; and encode the residual to produce encoded data of attributes of the point cloud for the bitstream.

12. A decoder for decoding a bitstream of compressed point cloud data to generate attributes of points of a reconstructed point cloud, wherein the point cloud's geometry is represented by a voxel-based structure with a plurality of nodes having parent-child relationships by recursively splitting a volumetric space containing the point cloud into sub-volumes each associated with a node of the voxel-bases structure, the decoder comprising:

a processor; and a memory storage device storing instructions executable by the processor, wherein the processor is configured to:

decode a residual of attributes of a present node of the point cloud from the bitstream;

determine a difference between attributes of a present parent node and each parent node of a first set of parent nodes sharing a face or an edge with the present node, wherein the present parent node is the parent node of the present node;

select a second set of parent nodes from the first set of parent nodes according to the difference, wherein the second set of parent nodes includes the present parent node;

determine a predicted value for the attributes of the present node according to attributes of the second set of parent nodes;

determine a predicted transform coefficient by applying Region-Adaptive Hierarchal Transform (RAHT) to the predicted value of the attributes of the present node; and determine from the residual and the predicted transform coefficient the attributes of the present node by applying an inverse RAHT.

13. A method for decoding a bitstream of compressed point cloud data to generate attributes of points in a reconstructed point cloud, wherein the point cloud's geometry is represented by a voxel-based structure with a plurality of nodes having parent-child relationships by recursively splitting a volumetric space containing the point cloud into sub-volumes each associated with a node of the voxel-bases structure, the method comprising:

decoding a residual of attributes of a present node of the point cloud from the bitstream;

determining a difference between attributes of a present parent node and each parent node of a first set of parent nodes sharing a face or an edge with the present node, wherein the present parent node is the parent node of the present node;

selecting a second set of parent nodes from the first set of parent nodes according to the difference, wherein the second set of parent nodes includes the present parent node;

determining a predicted value for the attributes of the present node according to attributes of the second set of parent nodes;

determining a predicted transform coefficient by applying Region-Adaptive Hierarchal Transform (RAHT) to the predicted value of the attributes of the present node; and determining from the residual and the predicted transform coefficient the attributes of the present node by applying an inverse RAHT.

14. The method according to claim 13, wherein determining the difference between the attributes of the present parent node and each parent node of the first set of parent nodes includes:

determining a maximum difference among each parent node of the first set of parent nodes and the present parent node;

providing a first threshold; and if the maximum difference is smaller than the first threshold, selecting all parent nodes of the first set of parent nodes.

15. The method according to claim 13, wherein determining the difference between the attributes of the present parent node and each parent node of the first set of parent nodes includes:

determining a difference between the attributes of each of the parent nodes in the first set of parent nodes and the present parent node;

providing a second threshold; and selecting parent nodes of the first set of parent nodes if the respective difference is smaller than the second threshold.

16. The method according to claim 15, wherein at least one of the first threshold or the second threshold is fixed.

17. The method according to claim 15, wherein at least one of the first threshold or the second threshold is determined according to a distribution of the attributes within the complete point cloud.

18. The method according to claim 15, wherein at least one of the first threshold or the second threshold is determined according to the first set of parent nodes.

19. The method according to claim 15, wherein the second threshold is a percentage of the first threshold.

20. The method according to claim 15, wherein at least one of the first threshold or the second threshold is determined according to a ration between the attributes of the present node and the attributes of parent nodes of the first set of parent nodes.

21. The method according to claim 15, wherein at least one of the first threshold or the second threshold is included into the bitstream.

22. The method according to claim 21, wherein at least one of the first threshold or the second threshold is included into the bitstream only at the top of at least one subtree for which the at least one of the first threshold or the second threshold is used and is inherited by all nodes in the subtree for which there is no explicit signaling of another first or second threshold.

* * * * *